US012277875B2

(12) United States Patent
Gunuskey

(10) Patent No.: US 12,277,875 B2
(45) Date of Patent: Apr. 15, 2025

(54) IDENTIFICATION BADGE WITH INCORPORATED SAFETY FEATURES

(71) Applicant: Keith E. Gunuskey, Honesdale, PA (US)

(72) Inventor: Keith E. Gunuskey, Honesdale, PA (US)

( * ) Notice: Subject to any disclaimer, the term of this patent is extended or adjusted under 35 U.S.C. 154(b) by 191 days.

(21) Appl. No.: 18/205,620

(22) Filed: Jun. 5, 2023

(65) Prior Publication Data

US 2023/0394996 A1 Dec. 7, 2023

Related U.S. Application Data

(60) Provisional application No. 63/365,913, filed on Jun. 6, 2022.

(51) Int. Cl.

| | |
|---|---|
| ***B26B 1/04*** | (2006.01) |
| ***A45C 1/06*** | (2006.01) |
| ***A45C 11/18*** | (2006.01) |
| ***A45D 24/06*** | (2006.01) |
| ***A45D 24/08*** | (2006.01) |
| ***B26B 5/00*** | (2006.01) |
| ***G09F 3/20*** | (2006.01) |

(52) U.S. Cl.

CPC ............ *G09F 3/207* (2013.01); *A45C 11/182* (2013.01)

(58) Field of Classification Search

CPC ................ A45C 1/06; A45C 2001/065; A45C 2001/067; A45C 11/182; A45C 2001/062; B60R 22/32; B60R 2022/328; B25B 13/48

See application file for complete search history.

(56) References Cited

U.S. PATENT DOCUMENTS 4,680,861 A * 7/1987 Meurer .................. B60R 22/32 248/37.3
5,027,477 A * 7/1991 Seron ........................ F16P 1/00 24/3.13
5,285,577 A * 2/1994 Carney .................. B26B 27/00 30/294
5,561,331 A * 10/1996 Suyama ............ G07C 9/00309 340/426.3
5,918,372 A * 7/1999 Materne ................. B60R 22/32 280/801.1
5,956,985 A * 9/1999 Chang ................. A44B 15/005 116/DIG. 1
6,003,181 A * 12/1999 Wenk .................... B43M 7/007 30/294

(Continued)

*Primary Examiner* — Shin H Kim
(74) *Attorney, Agent, or Firm* — Wendy W. Koba

(57) ABSTRACT

A handheld device configured to accomplish several functions can include a body having a front side and a rear side. The front and rear sides can extend in parallel and can be spaced apart by a top side, a bottom side, an upper side, and a lower side. The top side can include a slot configured to receive a credit card or an identification card therein. The front side can include an opening into the slot. The bottom side can include a glass breaker extending therethrough. The glass breaker can be movable with respect to the body. A cutter can extend outwardly from the lower side. The cutter can at least partially surround a blade and can be configured to cut a seat belt. A guard can be removably attachable to a portion of the lower side and the cutter.

17 Claims, 8 Drawing Sheets

(56) References Cited

U.S. PATENT DOCUMENTS 6,220,973 B1 * 4/2001 Hsu .................... A63B 57/203
473/406
6,286,397 B1 * 9/2001 Taggart .................... B25F 1/04
81/177.4
6,418,628 B1 * 7/2002 Steingass ................ B60R 22/32
30/367
6,460,698 B1 * 10/2002 Wang ........................ B25F 1/02
70/456 R
7,308,771 B2 * 12/2007 Memelink ................. G09F 3/20
150/147
7,810,415 B2 * 10/2010 Adamany ........... B25B 27/0071
7/168
9,815,212 B2 * 11/2017 Barr .......................... B26B 5/00
10,265,874 B1 * 4/2019 Morgan ................ B26B 11/006
D877,594 S * 3/2020 Liang ............................. D8/105
10,595,611 B2 * 3/2020 Berkley ............... A45C 13/005
10,878,686 B1 12/2020 Pederson et al.
11,178,947 B2 11/2021 Tran et al.
11,571,050 B2 * 2/2023 Tran ......................... A45C 1/06
11,618,148 B2 * 4/2023 Weinberger ............. B25B 13/56
7/168
11,670,195 B2 * 6/2023 Mitchell .............. B65D 25/205
40/653
11,737,531 B2 * 8/2023 Tran ........................ B25F 1/006
150/137
11,896,098 B2 * 2/2024 Zhang ...................... A45C 1/06
12,082,667 B2 * 9/2024 Tran ........................ B25F 1/006
2002/0056652 A1 * 5/2002 Kawamura .......... A45C 11/182
206/37
2002/0179463 A1 * 12/2002 Newman ................ A45C 11/00
206/234
2010/0317247 A1 * 12/2010 McGlynn .................. B60R 7/04
441/80
2014/0259438 A1 * 9/2014 Rubin ..................... B25F 1/006
7/163
2015/0033562 A1 2/2015 Posey
2017/0265610 A1 * 9/2017 Smith, II ................ B29C 51/44
2018/0064223 A1 * 3/2018 Singer ...................... A45C 1/06
2018/0311804 A1 * 11/2018 Weinberger ............. B25B 13/56
2020/0229557 A1 * 7/2020 Tran ........................ B25F 1/006
2021/0112935 A1 * 4/2021 Tran ........................ B25F 1/006
2023/0136219 A1 * 5/2023 Zhang .................. A45C 13/185
150/131
2023/0394996 A1 * 12/2023 Gunuskey ............ A45C 11/182

* cited by examiner

IDENTIFICATION BADGE WITH INCORPORATED SAFETY FEATURES

CROSS-REFERENCE TO RELATED APPLICATION

This application claims priority to U.S. Provisional Application No. 63/365,913, filed Jun. 6, 2022 and herein incorporated by reference.

TECHNICAL FIELD

The presently disclosed technology relates generally to a multifunctional tool or device, and more particularly to a badge holder configured to accomplish several functions.

BACKGROUND OF THE DISCLOSURE

Many employers provide employees with an identification card. Some employers require verification of an identification card upon entry into a workplace. Some employers have even invested in electronic sensors at particular entrance points, which require an employee to scan their identification card to gain entry. As a result, employees often carry their identification card with them during the workday or during their shift.

Badge holders can come in a variety of sizes, shapes, and configurations. For example, it is known to include a spring-loaded reeled tether on a badge holder, which helps prevent loss of the badge holder. GOVO, LLC of Katy, Texas sells a variety of different badge holders or wallets. Certain versions can hold anywhere from one to four (for example) identification cards, and include a clip that allows the badge holder to be easily carried on a belt, pocket, key chain, backpack, or lanyard.

SUMMARY OF THE INVENTION

The present invention is directed to addressing limitations found in prior art identification card ("badge") holders, particularly in terms of providing additional safety functions. Indeed, despite the numerous varieties of badge holders currently available on the market, it would be beneficial to provide a badge holder that provides more functions than conventional badge holders. The additional functionality could prove particularly beneficial in an emergency situation, such as a school shooting scene. The presently disclosed technology overcomes the above and other limitations in the prior art.

In one embodiment, the presently disclosed technology is a survival badge and/or utility tool that can be particularly beneficial in an emergency situation, such as at a school shooting. As school safety funding began and continues to flow from the state and federal government to address the increase in school shootings, many school districts invested in safety equipment (e.g., flashlights, audible alarms, tourniquets, etc.) for individual classrooms. The problem is that unless school staff have this equipment on their person, they may encounter a situation where they cannot access the safety equipment designed to help them in an emergency. Furthermore, since emergencies tend not to be planned, when emergencies happen it is well documented that individuals develop tunnel vision and may not be able to remember where their safety equipment is located. Having numerous survival and safety equipment items stored in a badge, for example around the wearer's neck, provides the wearer user with immediate access to survival equipment should an emergency happen.

In a particular embodiment, the presently disclosed technology is directed to a handheld device configured to accomplish several functions. The device can include a body having a front side and a rear side. The front and rear sides can extend in parallel and can be spaced apart by a top side, a bottom side, an upper side, and a lower side. The top side can include a slot configured to receive a credit card or an identification card therein. The front side can include an opening into the slot. The bottom side can include a glass breaker extending therethrough. The glass breaker can be movable with respect to the body. A cutter can extend outwardly from the bottom side. The cutter can at least partially surround a blade and can be configured to cut a seat belt. A guard can be removably attachable to a portion of the bottom side and the cutter.

In another embodiment, the presently disclosed technology is directed to a handheld badge holder configured to accomplish several functions. The badge holder can include a body having a planar front side and a planar rear side. The front and rear sides can extend in parallel and can be spaced apart by a top side, a bottom side, an upper side, and a lower side. The top side can include a first slot configured to receive a credit card or an identification card therein, a second slot configured to receive a writing implement therein, and a projection extending outwardly therefrom. The projection can include a passageway therethrough. The passageway can be configured to receive at least a portion of a lanyard therethrough. The front side can include an opening into the first slot. The rear side can include removable mirror tape and a hole configured to allow noise generated within the body to pass through the rear side. The bottom side can include a glass breaker extending therethrough. The glass breaker can be movable with respect to the body. A cutter can extend outwardly from the bottom side. The cutter can at least partially surround a blade and can be configured to cut a seat belt. A guard or protector can be removably attachable to a portion of the bottom side and the cutter.

Yet another particular embodiment may take the form of an "administrator" badge useful in an academic environment, where the specific functions included within the badge are particularly well-suited for handling emergency situations within a classroom setting. A student badge embodiment is also proposed, which provides student-directed functions (including a flashlight), while not including more physically harmful functions (such as glass breaking).

Other and further embodiments or features will become apparent below during the course of the following discussion and by reference to the related drawings.

BRIEF DESCRIPTION OF THE DRAWINGS

The foregoing summary, as well as the following detailed description of the presently disclosed technology, will be better understood when read in conjunction with the appended drawings. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

Figure 1:
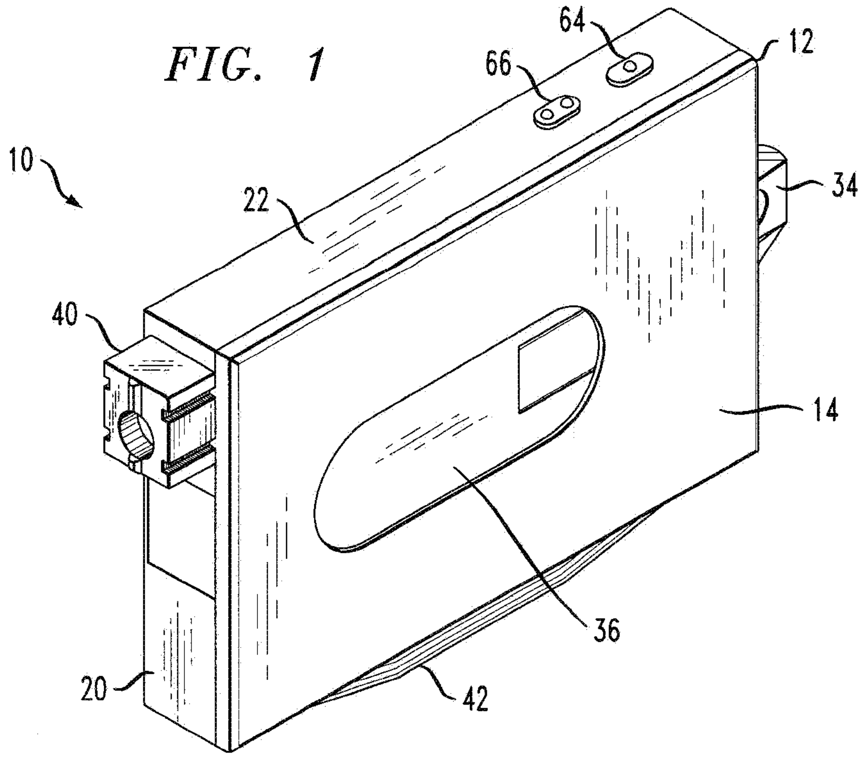
FIG. 1 is a front perspective view of a device according to an embodiment of the presently disclosed technology.

While systems, devices and methods are described herein by way of examples and embodiments, those skilled in the art recognize that the systems, devices and methods of the presently disclosed technology are not limited to the embodiments or drawings described. Rather, the presently disclosed technology covers all modifications, equivalents and alternatives falling within the spirit and scope of the appended claims. Any headings used herein are for organizational purposes only and are not meant to limit the scope of the description or the claims.

Certain terminology is used in the following description for convenience only and is not limiting. The words "bottom," "top," "left," "right," "lower" and "upper" designate directions in the drawings to which reference is made. Unless specifically set forth herein, the terms "a," "an" and "the" are not limited to one element but instead should be read as meaning "at least one." As used herein, the word "may" is used in a permissive sense (i.e., meaning having the potential to) rather than the mandatory sense (i.e., meaning must). The terminology includes the words noted above, derivatives thereof and words of similar import.

Referring to the drawings in detail, wherein like numerals indicate like elements throughout, FIGS. 1-8 show a device, generally designated 10, according to the presently disclosed technology. The device 10 is configured to accomplish several functions. The device 10 can optionally be a handheld device or tool, such that the device 10 can be sized, shaped, and/or configured to fit easily and conveniently in the palm of a user's hand. The device 10 can be a badge holder or a wallet, but is not limited to those particular configurations.

Figure 2:
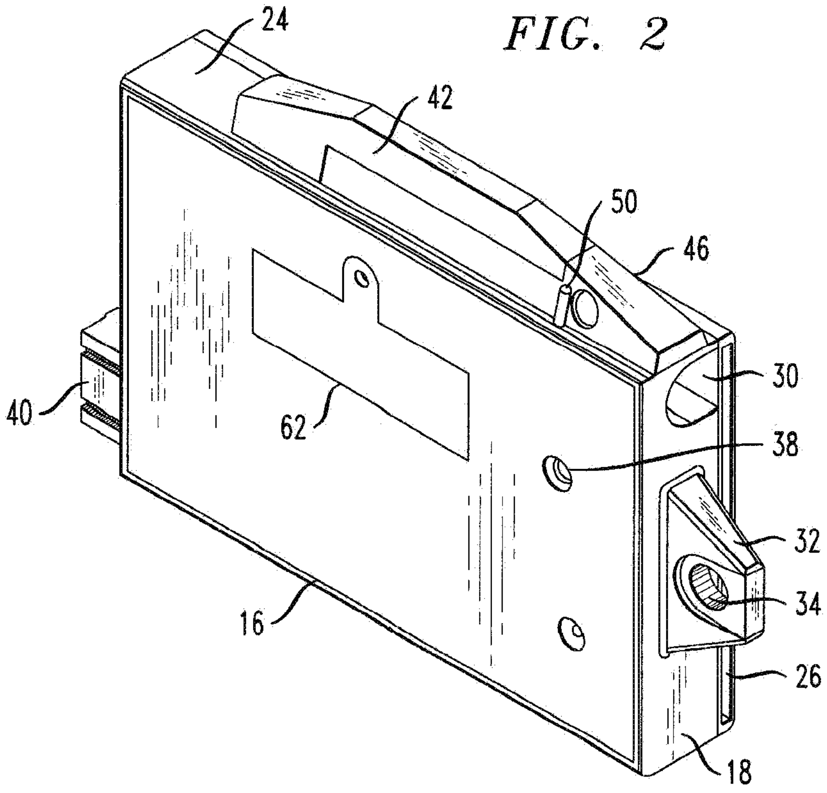
FIG. 2 is a rear perspective view of the device shown in FIG. 1.
Figure 3:
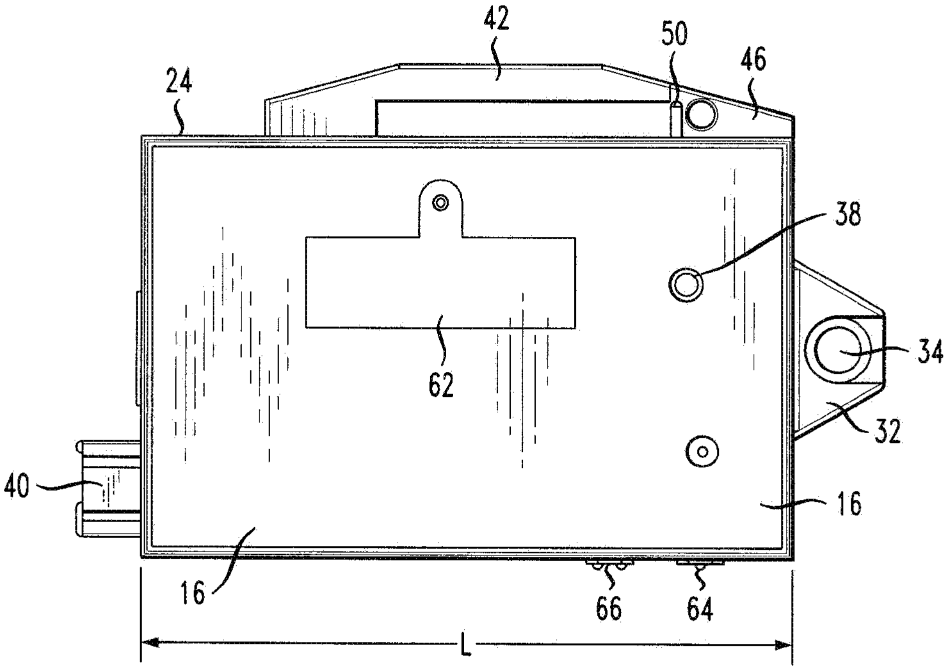
FIG. 3 is a rear elevation view of the device shown in FIG. 1.

In one optional embodiment, the device 10 can include a body 12 having a front side or surface 14 (shown in FIG. 1) and an opposing rear side or surface 16 (shown in FIG. 2). Each of the front and rear sides 14, 16 can be flat or planar and can extend in parallel. The front and rear sides 14, 16 can be spaced apart by a top side or surface 18, a bottom side or surface 20, an upper side or surface 22, and a lower side or surface 24.

Figure 4:
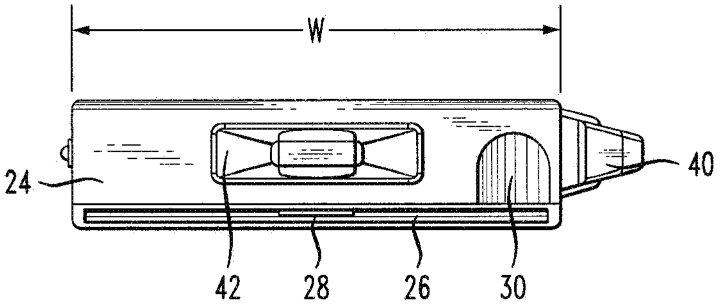
FIG. 4 is a top plan view of the device shown in FIG. 1.
Figure 5:
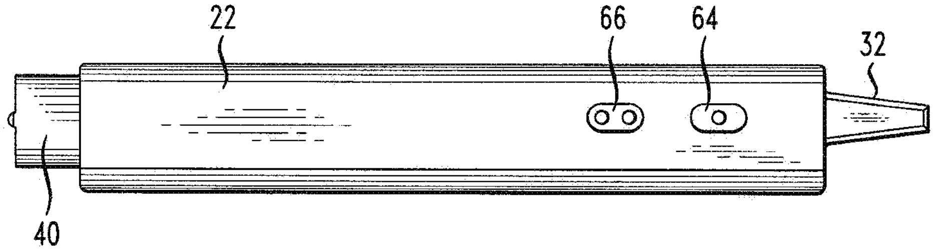
FIG. 5 is a left side elevation view of the device shown in FIG. 1.

The front and rear sides 14, 16 can be significantly larger than the top and bottom sides 18, 20, as well as the upper and lower sides 22, 24. For example, as shown in FIG. 4, the front and rear sides 14, 16 can have the same width W, for example, as the top and bottom sides 18, 20. However, the length L (see FIG. 3) of the front and rear sides 14, 16 can be multiple times greater than the length of the top and bottom sides 18, 20. Alternatively or additionally, the length of the front and rear sides 14, 16 can have the same length, for example, as the upper and lower sides 22, 24. However, width of the front and rear sides 14, 16 can be multiple times greater than the width of the upper and lower sides 22, 24.

Although the device 10 shown in FIGS. 1-8 and described above is in the shape of a rectangular object that generally mirrors, corresponds to, and/or is slightly larger than the size, shape, and/or configuration of an identification card (e.g., a driver's license) and/or a credit card, the presently disclosed technology is not so limited. Instead, the device 10 can have any of a variety of sizes, shapes, and/or configurations that accomplish the functionality described herein.

Referring to FIGS. 2 and 4, the top side 18 of the device 10 can include a first slot 26 configured to receive a credit card or an identification card therein. The slot 26 can optionally be rectangular in shape with a length and width that is at least slightly larger than the corresponding dimensions of a credit card or an identification card. The slot 26 can be sized to hold a single credit card or identification card, or can be larger in size to hold multiple cards stacked on top of each other.

As shown in FIG. 4, the first slot 26 can extend almost the entire width of the device 10. Optionally, the first slot 26 can extend almost the entire length of the device 10. Thus, the device 10 may be only slightly wider than the width and the length of a credit card or an identification card. A tab or projection 28 can extend at least slightly into the first slot 26. The tab 28 can be configured to retain one or more cards within the first slot 26, and prevent one or more cards from inadvertently exiting the first slot 26. A center point of the tab 28 can be located at a center point of the width of the first slot 26.

Figure 7:
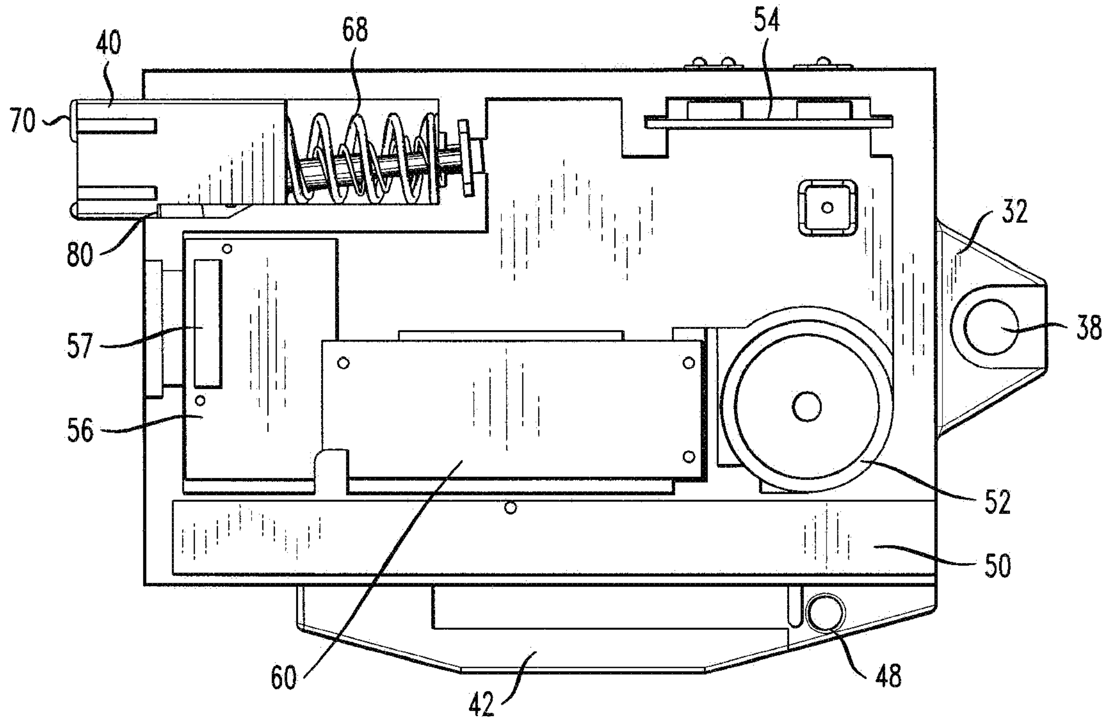
FIG. 7 is another rear elevation view of the device shown in FIG. 1, wherein the device is shown in an inverted position as compared to FIG. 3 and certain components are omitted for clarity.

Referring to FIGS. 2, 4, and 7, the top side 18 of the device 10 can optionally include a second slot or passageway 30 configured to receive a writing implement therein. The writing instrument can be an ink pen or an electronic pen, for example. The second slot 30 can be spaced apart from the first slot 26, such that the second slot 18 can be located proximate or closer to the lower side 24 of the device 10 than the upper side 22 of the device 10. Optionally, the second slot 30 can be separated from the first slot 26 by a flat or planar wall. A remainder portion of the second slot 30 can be arcuate or curved.

The top side 18 of the device 10 can optionally include a projection 32 extending outwardly therefrom. The projection 32 can include a passageway 34 extending therethrough. The passageway 34 can be configured to receive at least a portion of a lanyard, string, or rope therethrough.

Referring to FIG. 1, the front side 14 can include an opening 36 that extends into and/or communicates with the first slot 26. Optionally, the opening 36 can have an oval shape. The opening 36 can be configured to allow a user to engage one or more cards within the first slot 26 and move or slide the one or more cards out of the first slot 26. In addition, the opening 36 allows at least a portion of one of the cards to be visible, so that a portion of the card (e.g., a photograph) can be shown or seen without removing the card from the first slot 26.

Referring to FIG. 2, the rear side 16 of the device 10 can include a hole or opening 38 therein. The hole 38 can be configured to allow noise generated within the body 12 to pass through the rear side 16. The hole 38 can be directly aligned with or be positioned over a noise generating device within the body 12, as described in detail below.

In one embodiment, the rear side 16 of the device 10 can include removable mirror tape. Optionally, mirror tape can be applied to the rear side 16, such as within an indentation or indented area to protect and/or preserve the edges of the mirror tape. One or more openings or slots can be cut from the mirror tape before it is applied to the rear side 16 to accommodate and/or complement features of the rear side 16, such as the hole 38.

Optionally, the mirror tape is in place to be used in either or both of two emergency situations. First, if there is an active shooter and the wearer is unsure if a hallway, room, etc. is clear, the wearer can use the mirror to look into those areas without exposing any part of their head. Second, for an active shooter situation, it can be important to remain quiet, so not to "tip off" the intruder of your whereabouts. A staff member, for example, could use the reflective properties of the mirror to get the attention of first responders without making a sound.

The bottom side 20 of the device 10 can include a glass breaker 40 extending therethrough. The glass breaker 40 can be movable with respect to the body 12 between an extended position and a retracted position. The glass breaker 40 can be configured to break a window so that a user can exit a vehicle or building, for example, if necessary.

Optionally, the glass breaker 40 is formed completely or partially of acrylonitrile butadiene styrene (ABS) plastic, which can optionally be the same material used to form the bottom of the device 10. A portion of the glass breaker 40 can be formed of tool steel. Other portions of the device 10 can be formed of different materials, such as polycarbonate.

Figure 8:
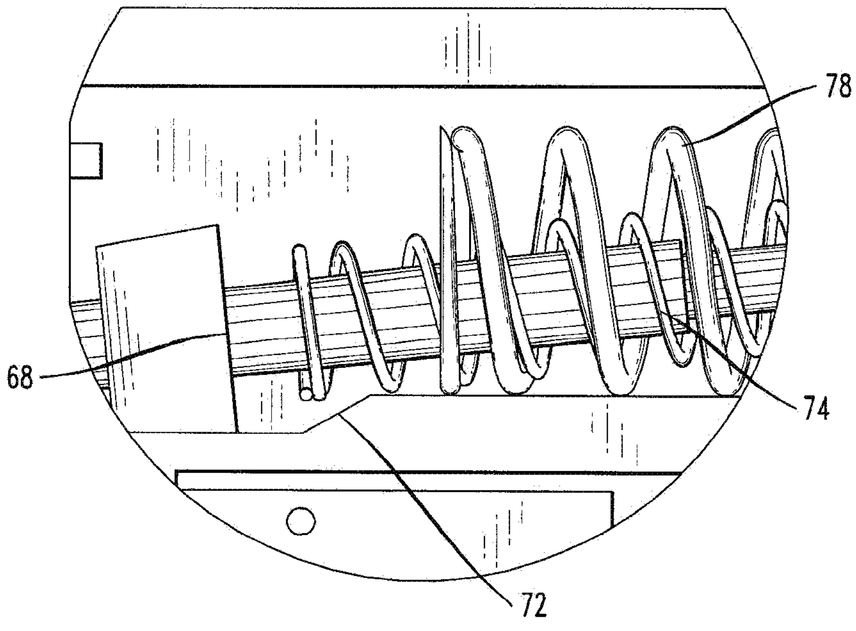
FIG. 8 is a magnified view of a portion of FIG. 7, taken from VIEW A of FIG. 7.

Referring to FIGS. 7 and 8, in one optional embodiment, the glass breaker 40 functions by depressing a striker guard 78 on or of the device 10 while pushing the glass breaker 40 against the glass to be broken. For example, as the striker guard 78 retracts into or toward the device 10, a first spring 74 of a striker assembly 68 compresses, which causes the striker assembly 68 will slide up an internal ramp 72 until it clears or passes beyond a lip 80, at which point the striker assembly 68 will slide forward and at least a portion of the glass breaker (i.e., the striker guard 78) will strike or hit the glass. This will result in the glass shattering. Once pressure is removed, a second spring 76 will return the button to the starting position, thereby resetting the mechanism. One benefit of the glass breaker 40 is that a user can break glass without risking swinging his or her hand at the glass.

Each of the first and second springs 74, 76 can be coil springs and can be concentric. For example, the first spring 74 can be located within or surrounded by the second spring 76. The first spring 74 can have a smaller thickness and/or a smaller spring constant than the second spring. 76.

Figure 6:
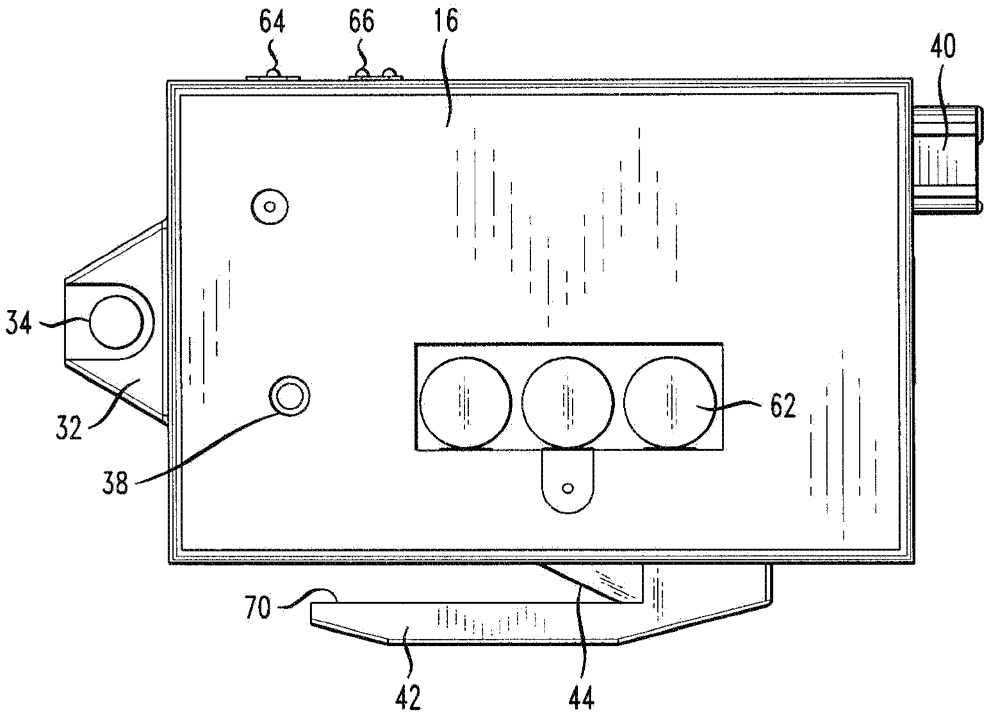
FIG. 6 is another rear elevation view of the device shown in FIG. 1, wherein the device is shown in an inverted position as compared to FIG. 3 and one or more components are omitted for clarity.

Referring to FIG. 6, a cutter 42 can extend outwardly from the lower side 24. The cutter 42 can at least partially surround a blade 44. The cutter 42 can be configured to cut a seat belt, for example, and can be configured to prevent accidental contact with the blade 44. In particular, the cutter 42 can extend over and/or surround a portion of the blade 44, thereby only allowing objects able to fit within a gap between an interior surface of the cutter 42 and the lower side 24 to contact the blade 44.

As shown in FIG. 7, a guard or safety cover 46 can be removably attachable to a portion of the lower side 24 and/or the cutter 42. When attached to the body 12 and/or the cutter 42, the guard 46 prevents or makes it more difficult for objects to enter the gap between an interior surface of the cutter 42 and the lower side 24. The guard 46 can include an opening or passageway 48 therethrough. The opening 48 can be sized, shaped, and/or configured to receive a keyring. As shown in FIG. 2, the guard 46 can include a raised bump or projection 50 designed to allow a user to more easily separate the guard 46 from the body 12 and/or the cutter 42. In addition, as shown in FIG. 6, the cutter 42 can include a raised bump or projection 70 to help hold the guard 46 in place.

Referring to FIGS. 6 and 7, the device 10 can include and/or the body 12 can enclose a noise and/or vibration device 52, such as a piezoelectric buzzer. The noise and/or vibration device 52 can be configured to generate a high or loud sound to draw attention to the holder of the device 10 for safety reasons. The device 10 can include and/or the body 12 can also enclose a push button circuit board 54, an integrated circuit board 56 with a light emitting diode (LED) 57, and a battery circuit board 60. Although the presently disclosed technology can include three circuit boards, that number is not required. Alternatively, the device 10 can include a single circuit board that includes all electronical components thereon, except for the buzzer, which can remain mounted to the body 12.

Referring to FIG. 6, the body 12 can be configured to enclose a power supply 62, such as one or more batteries. The power supply 62 is operatively connected to each of the noise and/or vibration device 52, the push button circuit board 54, the integrated circuit board 56, and the battery circuit board 60. In one optional embodiment, the one or more batteries 62 are disposable. In another optional embodiment, the one or more batteries 62 are rechargeable, such as via a USB cord connecting a conventional power outlet with the device 10. As shown in FIG. 2, a power supply cover 62 can be removably attachable to the rear surface 16.

An alarm or sound button 64 is operatively connected to the noise and/or vibration device 52 and/or the push button circuit board 54, which allows a user to selectively activate the noise and/or vibration device 52 by engaging the alarm button 64. Optionally, the alarm button 64 includes a single raised bump. The alarm button 64 is not limited to being a button, but could be in other forms (e.g., a slide switch) that allows for the functionality described herein.

An LED or light button 66 is operatively connected to the integrated circuit board 56 and/or the push button circuit board 54, which allows a user to selectively activate the LED by engaging the LED button 66. Optionally, the LED button 66 includes two spaced apart raised bumps. The LED button 66 is not limited to being a button, but could be in other forms (e.g., a slide switch) that allows for the functionality described herein.

It is considered that an important application of the inventive principles is within an academic environment, with the capabilities to incorporate emergency/safety functionalities with identification badges worn by administrators and students. In this environment, it is also considered that the capabilities of the badges worn by administrators and students may need to be different; for example, it may be unwise to include a glass cutter within badges worn by students.

Figure 9:
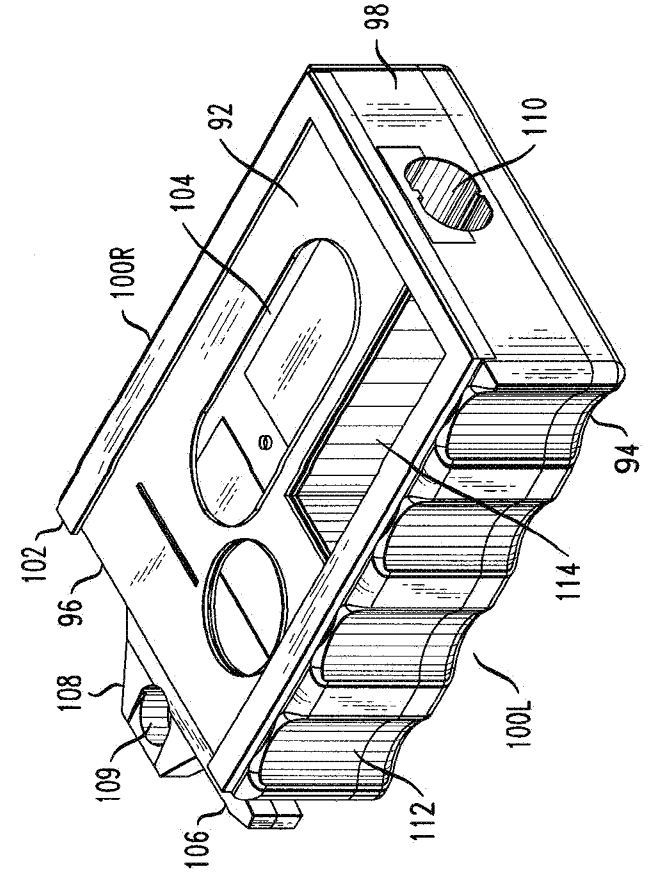
FIG. 9 is an isometric view of an exemplary administrator identification badge device formed in accordance with the present invention.

FIG. 9 illustrates an exemplary administrator badge 90 particularly configured to incorporate several emergency service components useful in an academic environment. As with device 10 described above, administrator badge 90 is essentially rectangular in form with a transparent front side 92, a rear side 94, a top surface 96, a bottom surface 98, and opposing side surfaces 100L, 100R.

As will be described in detail below and similar to device 10 as described above, front side 92 is formed to include a slot 102 within which an ID card (and/or additional important information, such as a medical insurance card) may be inserted and supported within administrator badge 90. An opening 104 may be included (of any desired shape) to facilitate the removal of the supported cards when necessary. Rear side 94 is formed to include both a mirror element (similar to the mirror tape described above), as well as perhaps a "tile" or similar type of locator element. These will be discussed below in association with FIG. 12. As will also be discussed below, top surface of administrator badge 90 includes both a cutter 106 (repositioned from a side surface as in the embodiment of device 10) and a projection 108 extending outwardly therefrom. Projection 108 can include a passageway 109 extending therethrough. Passageway 109 can be configured to receive at least a portion of a lanyard, string, or rope therethrough.

Bottom surface 98 of badge 90 includes an opening 110 within which a glass breaking component (such as element 40 described above) may be disposed. It is noted that in this embodiment, the glass breaker is more centrally located within the body of the badge than is found in the configuration of device 10. Additionally, one or both of side surfaces 100L, 100R may be formed (e.g., molded) to create gripping indentations 112, which may allow for an individual to maintain better control of badge 90 in emergency situations. embodiment, an exemplary side surface 90S is formed to include indents in a manner that allows for badge 90 to be easily gripped.

In some cases, badge 90 may also include a recessed area 114 within which a thumb (USB) drive may be stored. The drive may include particular student information. While recessed area 114 is visible in the illustration of FIG. 9, it is to be understood that front side 92 is preferably transparent in form (to allow for an inserted ID care to be clearly visible). Thus, there is no concern of an included USB drive (or any other element) falling out of place within badge 90.

Figure 10:
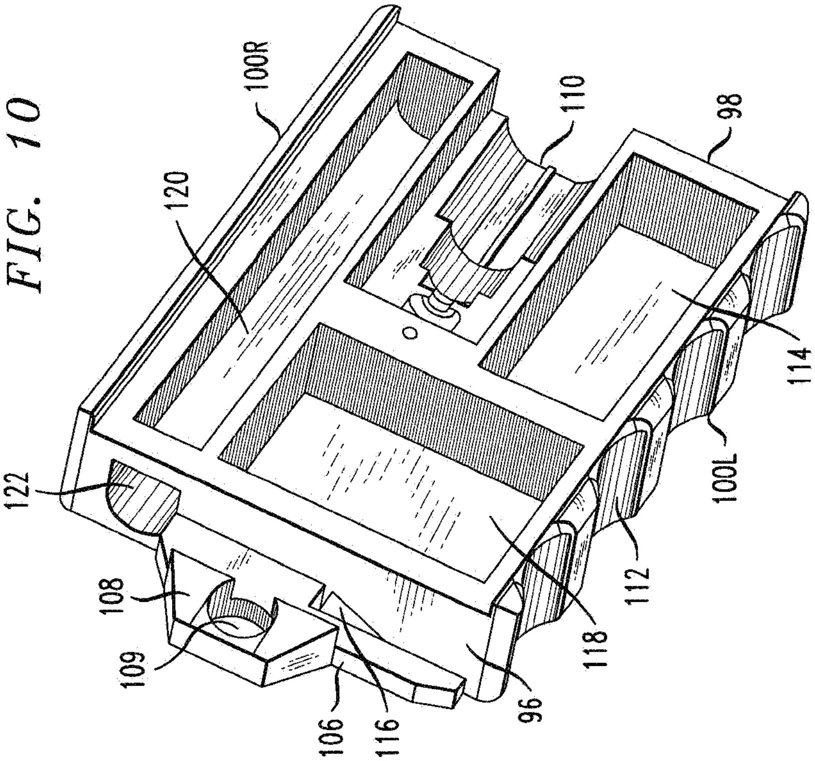
FIG. 10 is an isometric view of the interior of the administrator badge of FIG. 9.

FIG. 10 is an isometric view of administrator badge 90 with front side 92 removed for illustrative purposes. Various ones of the elements described above in association with FIG. 9 are again visible in this view. Particularly, seat belt cutter 106 as disposed on top surface 96 is better shown in this particular orientation, with its associated blade 116 shown as well. Also evident in this view is that projection 108 is formed as integrated with seat belt cutter 106. This is exemplary only.

An additional recessed area 118 supports the various batteries and other alarm elements as described above in association with device 10. Additionally, a channel 120 may be included within badge 90 to support a writing implement, with an aperture 122 of channel 120 included within top surface 96.

Figure 11:
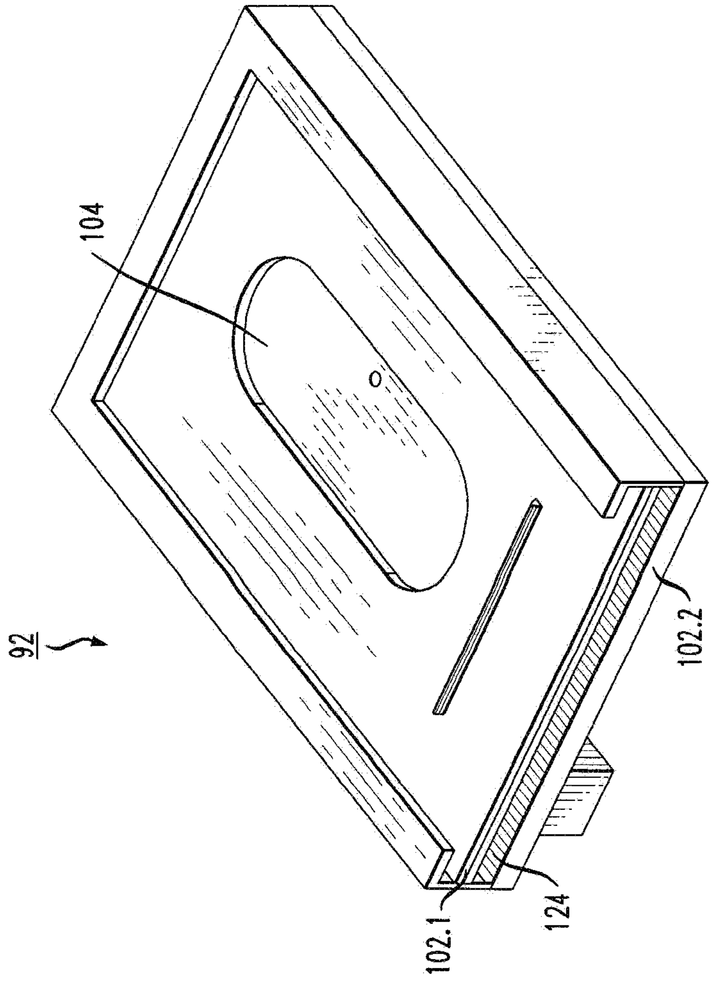
FIG. 11 illustrates an example front side of the administrator badge of FIG. 9.

FIG. 11 is an isometric view of an exemplary embodiment of front side 92. In this particular example, front side 92 includes a pair of individual slots 102.1 and 102.2, with a dividing wall 124 between them. It is contemplated that in this manner an ID badge may be disposed with top slot 102.1 (and visible through the transparent covering of front side

92, with any additional card including perhaps private/sensitive information retained within lower slot 102.2.

Figure 12:
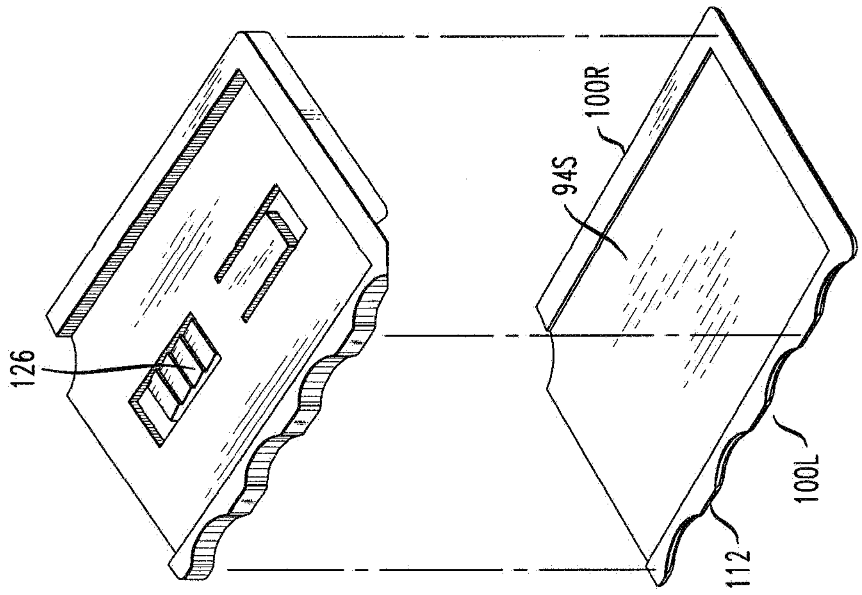
FIG. 12 is an exploded isometric view of an example rear side of the administrator badge of FIG. 9.

FIG. 12 is an exploded, isometric view of an exemplary embodiment of rear side 94. As mentioned above, a separate mirror element, or mirror tape or mirrored surface 94S is considered an important tool for use in various emergency situations. A locator tile (not shown) may also be stored within this compartment formed as rear side 94. Louvers 126 (or any other type of suitable textured surface) may be added to enable quick release from the remainder of badge 90.

Figure 13:
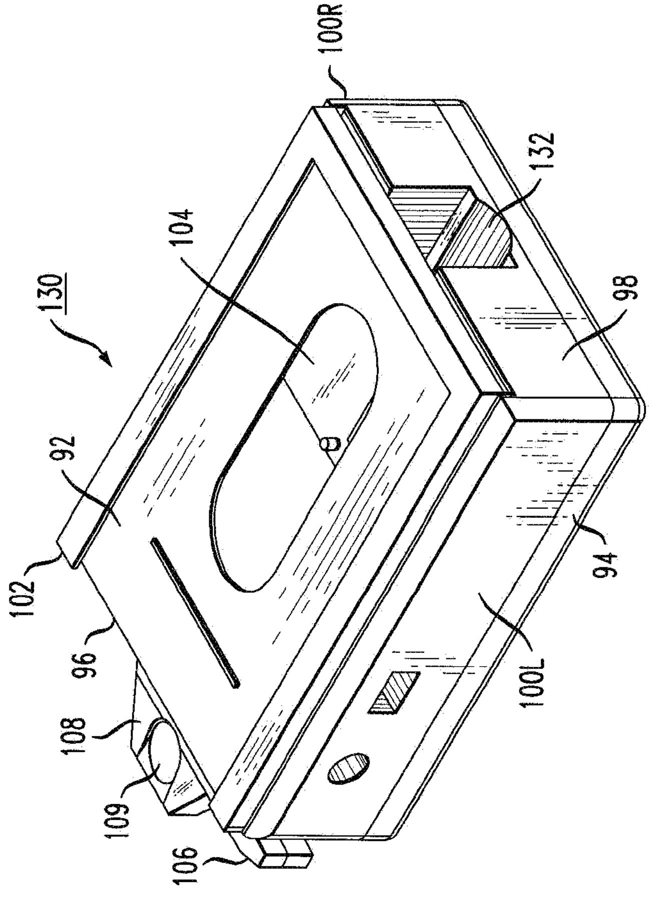
FIG. 13 is an isometric view of an exemplary student identification badge formed in accordance with the present invention.
Figure 14:
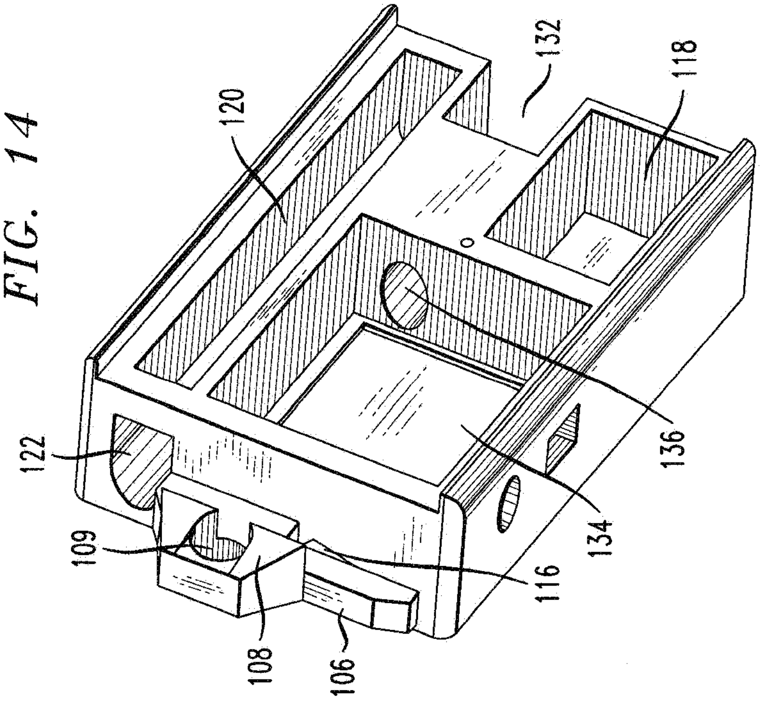
FIG. 14 is an isometric view of the interior of the student badge of FIG. 13.

As mentioned above, in an academic environment there are good reasons for an administrator's badge to include functionalities (such as glass breaking) that are not appropriate for the student population. FIG. 13 is an isometric view of a student badge 130 that is similar in many forms to administrator badge 90 as described above, but in this case does not include any type of glass breaking element. In its place, student badge 130 may be formed to include a mini flashlight, with an aperture 132 formed within bottom surface 134 to form a "window/lens" for the flashlight. The exterior design of student badge 130 may exhibit smooth side surfaces 100L, 100R to prevent any kind of additional gripping force that may be used for wrong purposes.

Even if it is interpreted that multiple embodiments are shown and/or described herein, it is understood that any one or more features of any particular embodiment can be omitted or included in (e.g., added to) another embodiment.

It will be appreciated by those skilled in the art that changes could be made to the embodiments described above without departing from the broad inventive concept thereof. It is understood, therefore, that the presently disclosed technology is not limited to the particular embodiments disclosed, but it is intended to cover modifications within the spirit and scope of the presently disclosed technology as defined by the appended claims.

I claim:

1. A handheld badge holder configured to accomplish several functions, the badge holder comprising:

a body having a planar front side and a planar rear side, the front and rear sides extending in parallel and being spaced apart by a top side, a bottom side, an upper side, and a lower side;

the top side including a first slot configured to receive a credit card or an identification card therein, a second slot configured to receive a writing implement therein, and a projection extending outwardly therefrom, the projection including a passageway therethrough, the passageway being configured to receive at least a portion of a lanyard therethrough;

the front side including an opening into the first slot;

the rear side including removable mirror tape and a hole configured to allow noise generated within the body to pass through the rear side;

the bottom side including a glass breaker extending therethrough, the glass breaker being movable with respect to the body;

a cutter extending outwardly from the lower side, the cutter at least partially surrounding a blade and being configured to cut a seat belt, a guard removably attachable to a portion of the lower side and the cutter; and the body enclosing a piezoelectric buzzer, a push button circuit board, an integrated circuit board with a light emitting diode (LED), and a battery circuit board, the body being configured to enclose one or more batteries therein.

2. The handheld badge holder of claim 1, wherein the glass breaker includes to concentric springs.

3. An identification badge holder device configured to accomplish several functions, the device comprising:

a body having a planar front side and a planar rear side, the front and rear sides extending in parallel and being spaced apart by a top side, a bottom side, an upper side, and a lower side;

the top side including a first slot configured to receive a credit card or an identification card therein, a second slot configured to receive a writing implement therein, and a projection extending outwardly therefrom, the projection including a passageway therethrough;

the front side including an opening into the first slot;

the bottom side including a glass breaker extending therethrough, the glass breaker being movable with respect to the body;

a cutter extending outwardly from the lower side, the cutter at least partially surrounding a blade, a guard removably attachable to a portion of the lower side and the cutter;

the body enclosing a piezoelectric buzzer, a push button circuit board, an integrated circuit board with a light emitting diode (LED), and a battery circuit board, the body being configured to enclose one or more batteries therein.

4. The identification badge holder device of claim 3, wherein the rear side includes a removable mirror element.

5. The identification badge holder device of claim 3, wherein the rear side includes a hole configured to allow noise generated within the body to pass through the rear side.

6. The identification badge holder device of claim 3, wherein the passageway through the projection is configured to receive at least a portion of a lanyard therethrough.

7. The identification badge holder device of claim 3, wherein the cutter is configured to cut a seat belt.

8. The identification badge holder device of claim 3, wherein the glass breaker includes to concentric springs.

9. A handheld device configured to accomplish several functions, the device comprising:

a body having a front side and a rear side, the front and rear sides extending in parallel and being spaced apart by a top side, a bottom side, an upper side, and a lower side;

the top side including a first slot configured to receive a credit card or an identification card therein;

the front side including an opening into the first slot and a second slot configured to receive a writing implement therein;

the bottom side including a glass breaker extending therethrough, the glass breaker being movable with respect to the body; and a cutter extending outwardly from the lower side, the cutter at least partially surrounding a blade and being configured to cut a seat belt, a guard removably attachable to a portion of the lower side and the cutter.

10. The handheld device of claim 9, wherein the front side further includes a projection extending outwardly therefrom, the projection including a passageway therethrough, the passageway being configured to receive at least a portion of a lanyard therethrough.

11. The handheld device of claim 10, wherein the rear side includes removable mirror tape and a hole configured to allow noise generated within the body to pass through the rear side.

12. The handheld device of claim 11, wherein the body encloses a piezoelectric buzzer, a push button circuit board, an integrated circuit board with a light emitting diode (LED), and a battery circuit board, the body being configured to enclose one or more batteries therein.

13. The handheld device of claim 12, wherein the glass breaker includes to concentric springs.

14. A student identification badge for use in an academic environment, comprising:

a body having a front side and a rear side, the front and rear sides extending in parallel and being spaced apart by a top side, a bottom side, an upper side, and a lower side;

the top side including a first slot configured to receive a credit card or an identification card therein;

the front side including an opening into the first slot and a pair of individual sub-slots separated by an interior wall, a first sub-slot sized for accepting a student identification card and a second sub-slot sized for accepting a student medical insurance card; and a cutter extending outwardly from the top side, the cutter at least partially surrounding a blade and being configured to cut a seat belt, a guard removably attachable to a portion of the lower side and the cutter.

15. An administration identification badge for use in an academic environment, comprising a body having a front side and a rear side, the front and rear sides extending in parallel and being spaced apart by a top side, a bottom side, an upper side, and a lower side;

the top side including a first slot configured to receive a credit card or an identification card therein;

the front side including an opening into the first slot;

a cutter extending outwardly from the top side, the cutter at least partially surrounding a blade and being configured to cut a seat belt, a guard removably attachable to a portion of the lower side and the cutter;

a glass breaking element extendable from the bottom side; and a locator tile disposed within the body.

16. The administration identification badge as defined in claim 15 further comprising an interior compartment for storing a USB drive.

17. The administration identification badge as defined in claim 15 wherein the first slot comprises a pair of individual sub-slots separated by an interior wall, a first sub-slot sized for accepting a student identification card and a second sub-slot sized for accepting a student medical insurance card.

* * * * *